US00RE49325E

(19) United States
(12) Reissued Patent
Pedersen

(10) Patent Number: US RE49,325 E
(45) Date of Reissued Patent: Dec. 6, 2022

(54) SPEAKER PHONE

(71) Applicant: GN Audio A/S, Ballerup (DK)

(72) Inventor: Rasmus Trudslev Pedersen, Ballerup (DK)

(73) Assignee: GN AUDIO A/S, Ballerup (DK)

(21) Appl. No.: 29/779,083

(22) Filed: Apr. 16, 2021

Related U.S. Patent Documents

Reissue of:
(64) Patent No.: Des. 845,924
Issued: Apr. 16, 2019
Appl. No.: 29/611,057
Filed: Jul. 18, 2017

(30) Foreign Application Priority Data

Feb. 1, 2017 (EM) ..... 003734128-0001

(51) LOC (13) Cl. ..... 14-03
(52) U.S. Cl.
USPC ..... D14/149; D14/215
(58) Field of Classification Search
USPC ..... D14/140, 140.2, 141.1, 142, 144, 147, D14/149, 204, 206, 212, 213, 248, 249, D14/356, 258, 432, 454, 221
CPC ..... H04M 1/6033; H04M 1/60041; H04M 3/568; H04M 9/022; H04M 9/08; H04R 9/06
See application file for complete search history.

(56) References Cited

U.S. PATENT DOCUMENTS

D141,306 S 5/1945 Michelli
D146,264 S 1/1947 Moonert
D175,296 S 8/1955 Chrzan
3,495,799 A 2/1970 Murgas
D218,925 S 10/1970 Soriano
D255,745 S 7/1980 Pedersen
D260,248 S 8/1981 Gallagher
D287,496 S 12/1986 Bricker
D300,322 S * 3/1989 Lam ..... D14/189
5,388,848 A 2/1995 Silva et al.
D399,210 S 10/1998 Rozier et al.
D412,676 S * 8/1999 Layes ..... D10/106.6
D415,147 S 10/1999 Adachi
D438,849 S 3/2001 Adachi et al.
(Continued)

OTHER PUBLICATIONS

Jabra Speak 710 Review. calloneinc.com. (online) 7 pgs. Posted: May 22, 2017. [Retrieved on Jul. 23, 2019 https ://www.calloneinc.com/jabra-speak-710-review/.

*Primary Examiner* — Philip S Hyder
(74) *Attorney, Agent, or Firm* — Hamre, Schumann, Mueller & Larson, P.C.

(57) CLAIM

The ornamental design for a speaker phone, as shown and described.

DESCRIPTION

FIG. 1 is a perspective view of the speaker phone
FIG. 2 is another perspective view thereof.
FIG. 3 is a front view thereof.
FIG. 4 is a back view thereof.
FIG. 5 is a side view thereof.
FIG. 6 is the other side view thereof.
FIG. 7 is a top view thereof; and,
FIG. 8 is a bottom view thereof.
The features shown in broken lines depict portions of the speaker phone that form no part of the claimed design. *The portions of the design located with the dot-dash boundary line in FIGS. 1 and 3 form no part of the claimed design.*

1 Claim, 6 Drawing Sheets

Figure 2:
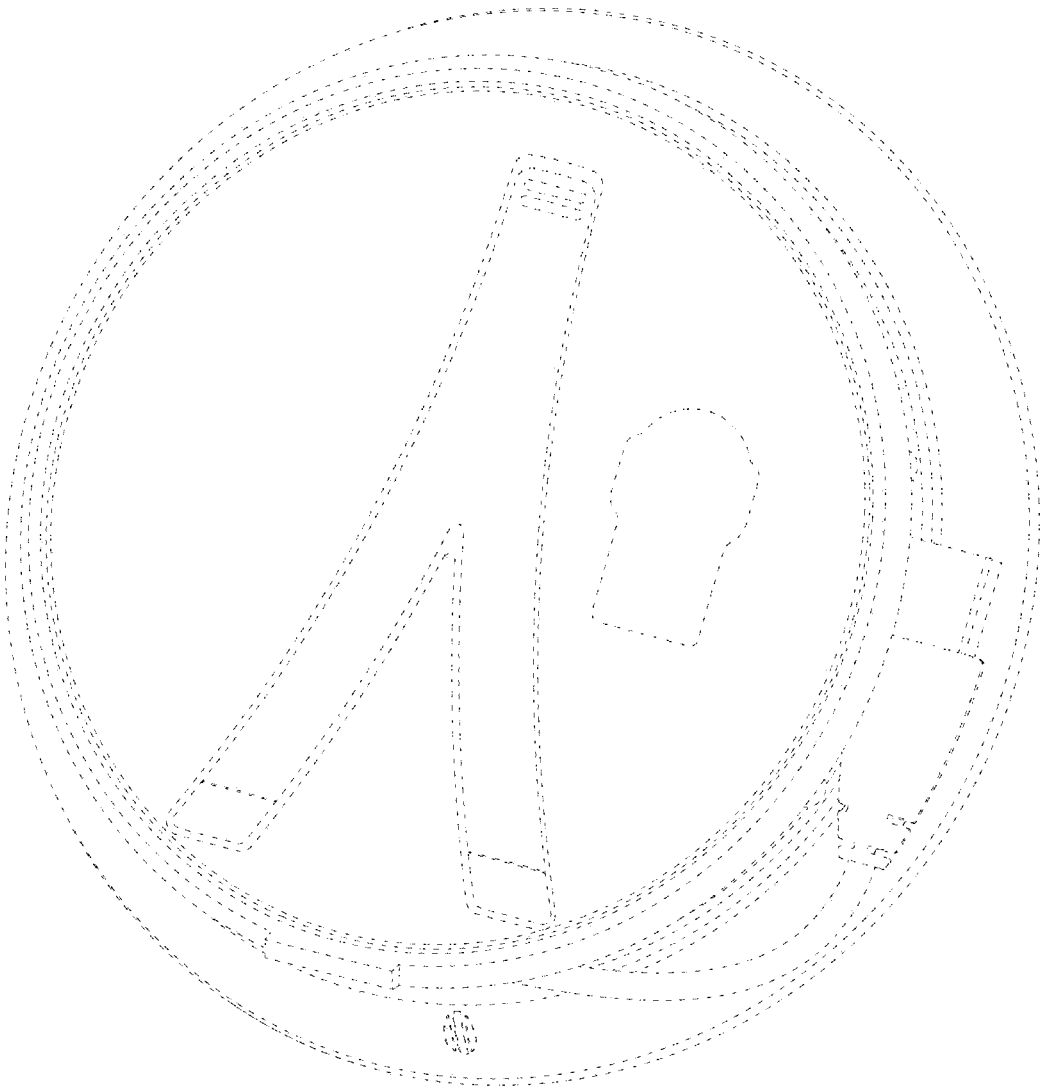
Figure 4:
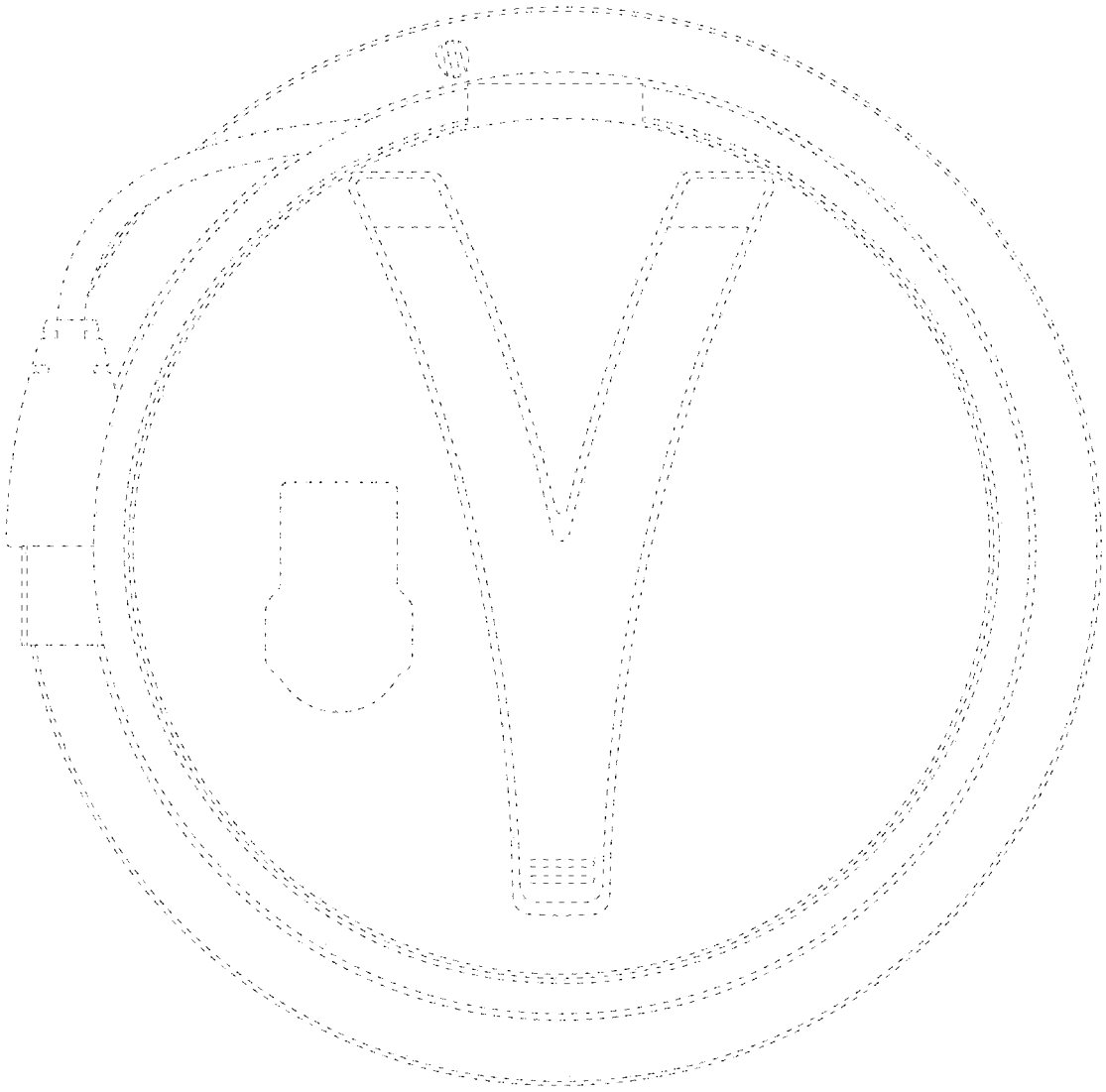
Figure 5:
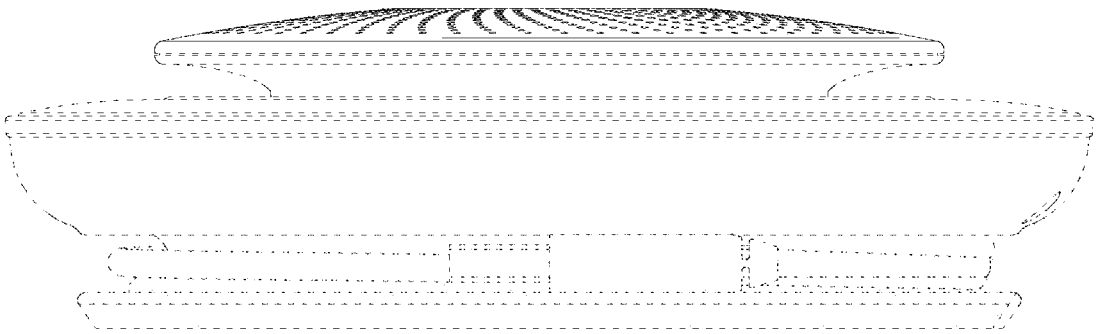
Figure 6:
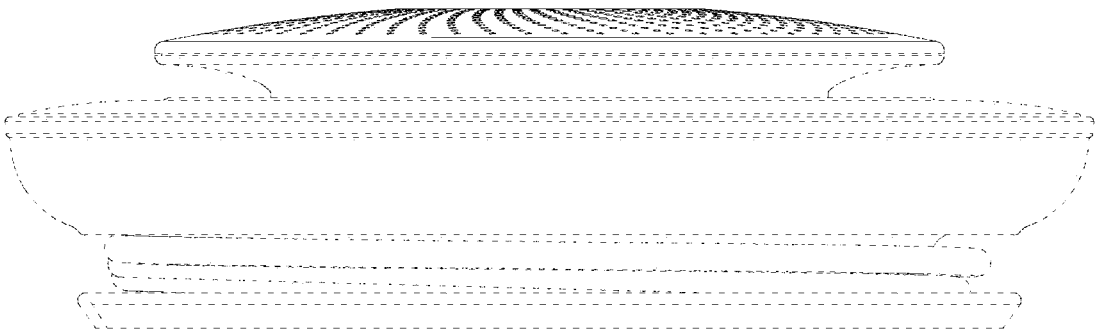
Figure 7:
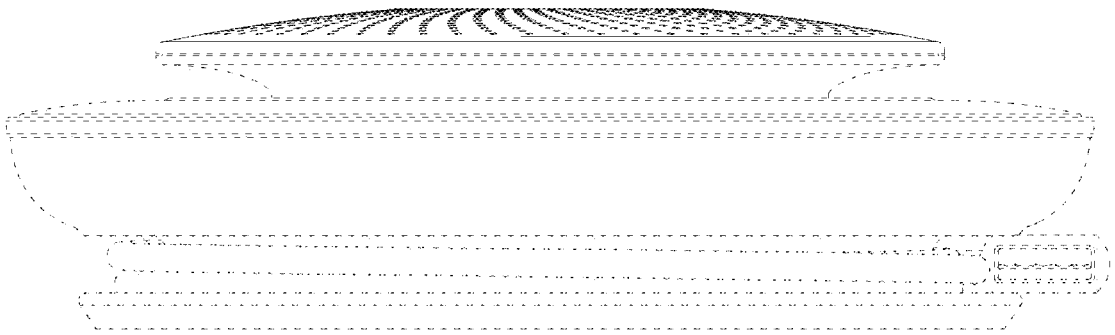
Figure 8:
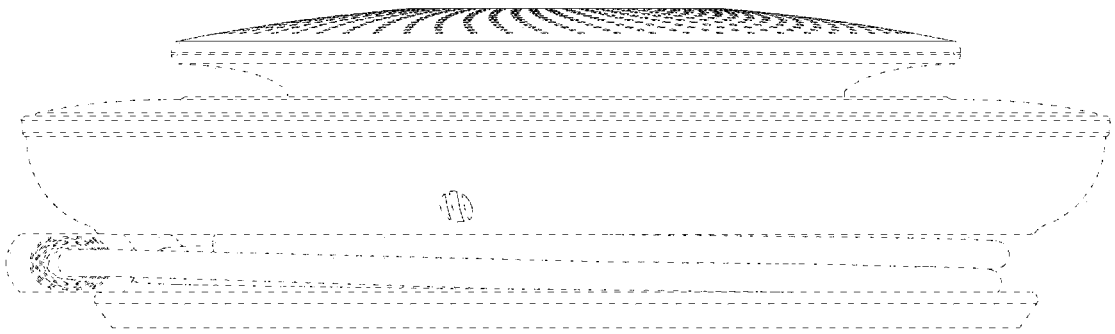

Matter enclosed in heavy brackets [ ] appears in the original patent but forms no part of this reissue; matter printed in italics indicates the additions made by reissue.

AMENDED

(56) References Cited

U.S. PATENT DOCUMENTS 6,216,377 B1 4/2001 Painsith
D458,910 S 6/2002 Kita
D461,795 S 8/2002 Mayette et al.
D474,169 S * 5/2003 Fletcher ..... D14/159
D474,900 S 5/2003 Underbrink
D491,733 S 6/2004 Manrique
D495,676 S * 9/2004 Slevin ..... D14/150
D497,974 S * 11/2004 Haug ..... D14/223
D503,707 S 4/2005 Boyer, Jr.
D504,427 S 4/2005 Hsu Li
D524,767 S 7/2006 Imboden et al.
D537,072 S * 2/2007 Kim ..... D14/215
D557,676 S * 12/2007 Suzuki ..... D14/149
D558,192 S 12/2007 Daly et al.
D558,698 S 1/2008 Chu
D560,209 S * 1/2008 Kim ..... D14/215
D571,747 S 6/2008 Chu
D571,796 S 6/2008 Mamizuka et al.
D587,910 S 3/2009 Frischling et al.
D590,386 S 4/2009 Leith et al.
D596,618 S 7/2009 Zha
D597,321 S 8/2009 Frankel et al.
D606,517 S * 12/2009 Nousiainen ..... D14/216
D606,763 S 12/2009 Chiu
D608,746 S 1/2010 Tu
D611,926 S 3/2010 Lev et al.
D613,953 S 4/2010 Hammer
7,762,518 B2 7/2010 Ogawa et al.
D632,094 S 2/2011 Shaha
D636,760 S * 4/2011 Cheng ..... D14/216
D638,813 S 5/2011 Liu
D639,267 S 6/2011 Delorenzo et al.
D655,759 S 3/2012 Still
D656,130 S * 3/2012 Bailey ..... D14/227
D658,189 S 4/2012 Zhao et al.
D664,776 S 8/2012 Pitts Brown
D665,797 S 8/2012 Novak
D677,264 S 3/2013 Lu et al.
D677,265 S 3/2013 Lu et al.
D682,805 S * 5/2013 Rath ..... D14/149
D695,029 S 12/2013 Jewett
D700,904 S * 3/2014 Miller ..... D13/168
D706,254 S 6/2014 Chang
D715,670 S * 10/2014 Stagg ..... D10/106.5
D717,770 S * 11/2014 Yamamoto ..... D14/216
D718,772 S 12/2014 Westrup et al.
8,964,381 B2 2/2015 Mai et al.
D725,661 S 3/2015 Snyder et al.
9,021,388 B1 4/2015 Morris
D728,507 S * 5/2015 Brandis ..... D14/149
D728,525 S * 5/2015 Zhang ..... D14/216
D728,580 S 5/2015 Campbell
D732,543 S 6/2015 Westrup et al.
D733,151 S 6/2015 Brierley
D735,164 S * 7/2015 Lin ..... D14/216
D740,778 S * 10/2015 Ookawa ..... D14/149
D746,821 S 1/2016 Oakley
D749,069 S 2/2016 Senoff
D749,559 S 2/2016 Senoff
D752,014 S * 3/2016 Bolmstrand ..... D14/204
D752,199 S * 3/2016 Berkman ..... D23/370
9,308,767 B1 4/2016 Waldron
D756,955 S * 5/2016 Wagner ..... D14/203.6
D761,238 S 7/2016 Ann et al.
D768,113 S * 10/2016 Lee ..... D14/216
D771,512 S * 11/2016 Kalyan ..... D10/106.5
D771,600 S * 11/2016 Hinokio ..... D14/228
D773,332 S * 12/2016 Kalyan ..... D10/106.5
D780,166 S 2/2017 Lin
D795,834 S * 8/2017 Pelland ..... D14/204
D807,327 S * 1/2018 Xiong ..... D14/216
D808,940 S 1/2018 Debaigue et al.
D811,386 S 2/2018 Oakley
D813,192 S * 3/2018 Zeng ..... D14/204
D814,436 S * 4/2018 Wen ..... D14/150
D819,592 S * 6/2018 Folkmann ..... D14/149
D820,830 S 6/2018 Lee et al.
D824,889 S 8/2018 Debaigue et al.
D828,333 S * 9/2018 Hu ..... D14/216
D829,690 S * 10/2018 Chen ..... D14/216
D832,306 S * 10/2018 Liao ..... D14/496
D833,450 S 11/2018 Oakley
D845,924 S 4/2019 Pedersen
D846,555 S 4/2019 Park et al.
2007/0029453 A1 2/2007 Hsiung
2007/0164191 A1 7/2007 Kim
2008/0265109 A1 10/2008 Derry et al.
2010/0051761 A1 3/2010 Wang et al.
2010/0051775 A1 3/2010 Wu et al.
2010/0059649 A1 3/2010 Buxton
2010/0142130 A1 6/2010 Wang et al.
2010/0223758 A1 9/2010 Hu et al.
2010/0308202 A1 12/2010 Hu et al.
2011/0050606 A1 3/2011 Zhang et al.
2012/0006950 A1 1/2012 Vandiver
2012/0145876 A1 6/2012 Zhou et al.
2012/0224714 A1* 9/2012 Couse ..... H04R 1/406 381/92
2014/0064535 A1* 3/2014 Zhao ..... H04R 1/021 381/332
2014/0085814 A1 3/2014 Kielland
2014/0306074 A1 10/2014 Zhang et al.
2014/0360805 A1* 12/2014 Berkman ..... H04R 1/02 181/141
2015/0028175 A1 1/2015 Larson
2015/0277494 A1 10/2015 Oakley
2015/0339896 A1* 11/2015 Stagg ..... G08B 17/113 340/521
2016/0273702 A1 9/2016 Shiba et al.
2016/0308571 A1 10/2016 Chiang et al.
2017/0027069 A1 1/2017 Yu et al.
2018/0196466 A1 7/2018 Koriyama
2019/0111855 A1 4/2019 Aloe et al.

* cited by examiner

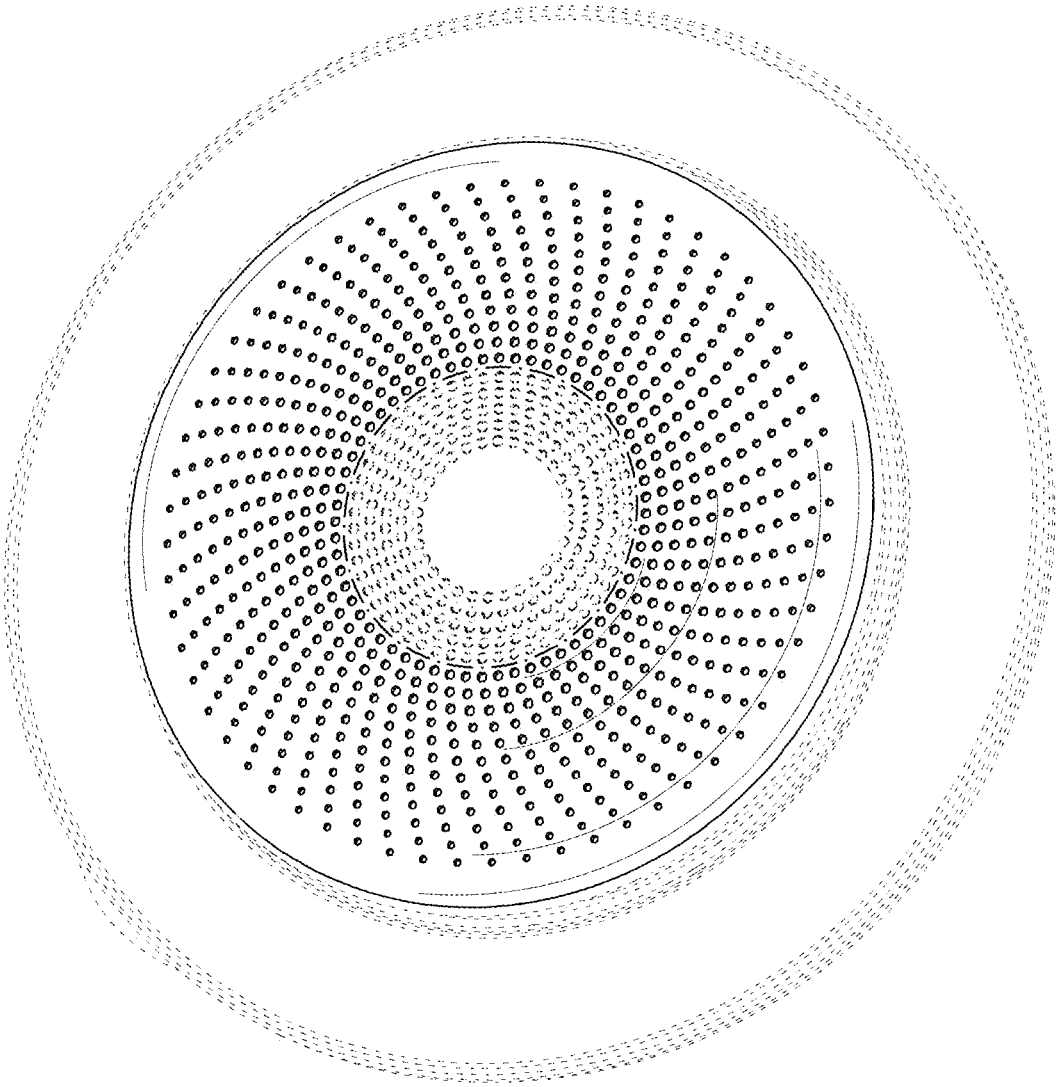
FIG. 1
AMENDED

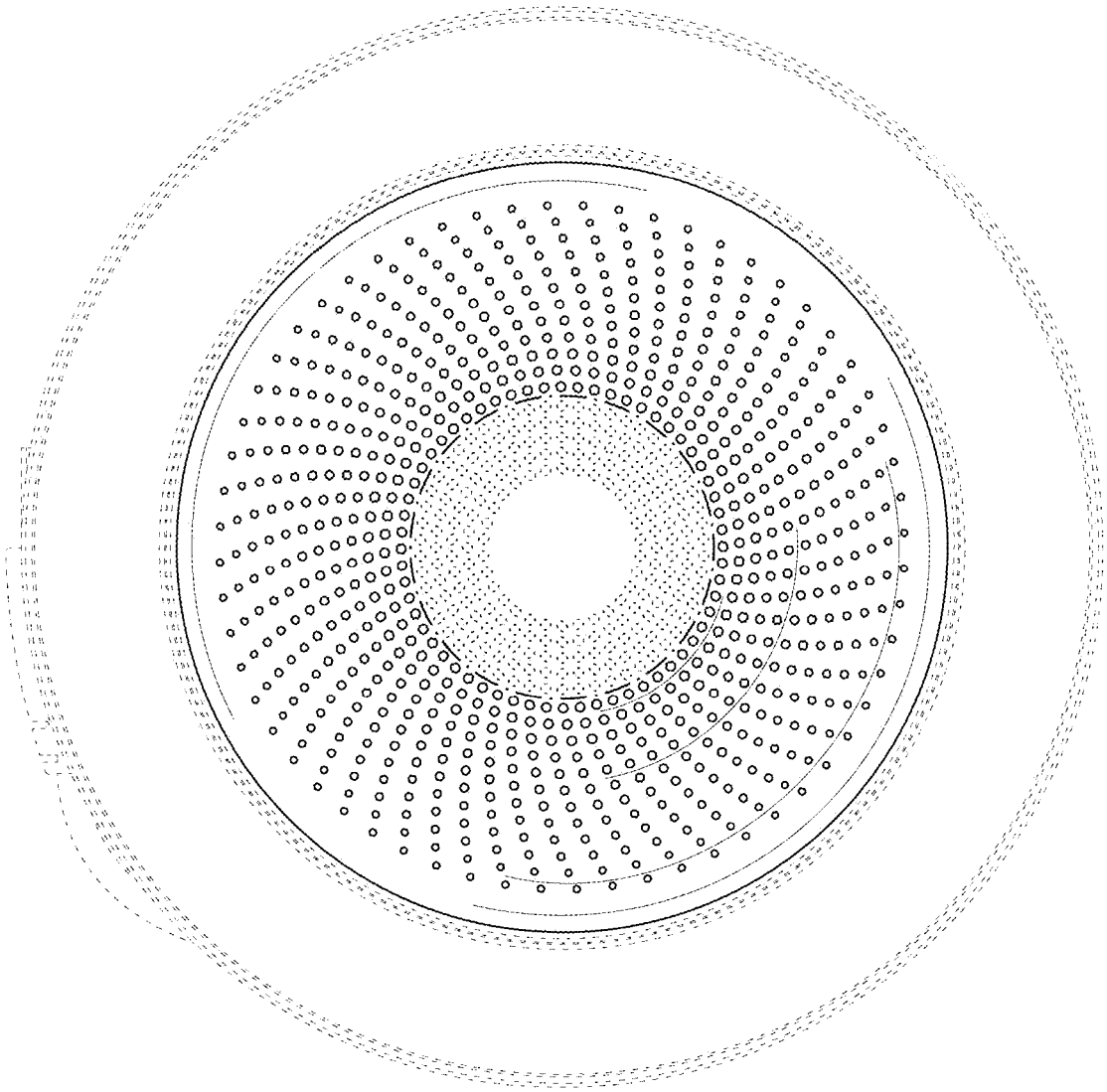
FIG. 3
AMENDED